Oct. 22, 1929.     E. BURHORN     1,732,963
COOLING AND CONDENSING TOWER
Filed June 20, 1927
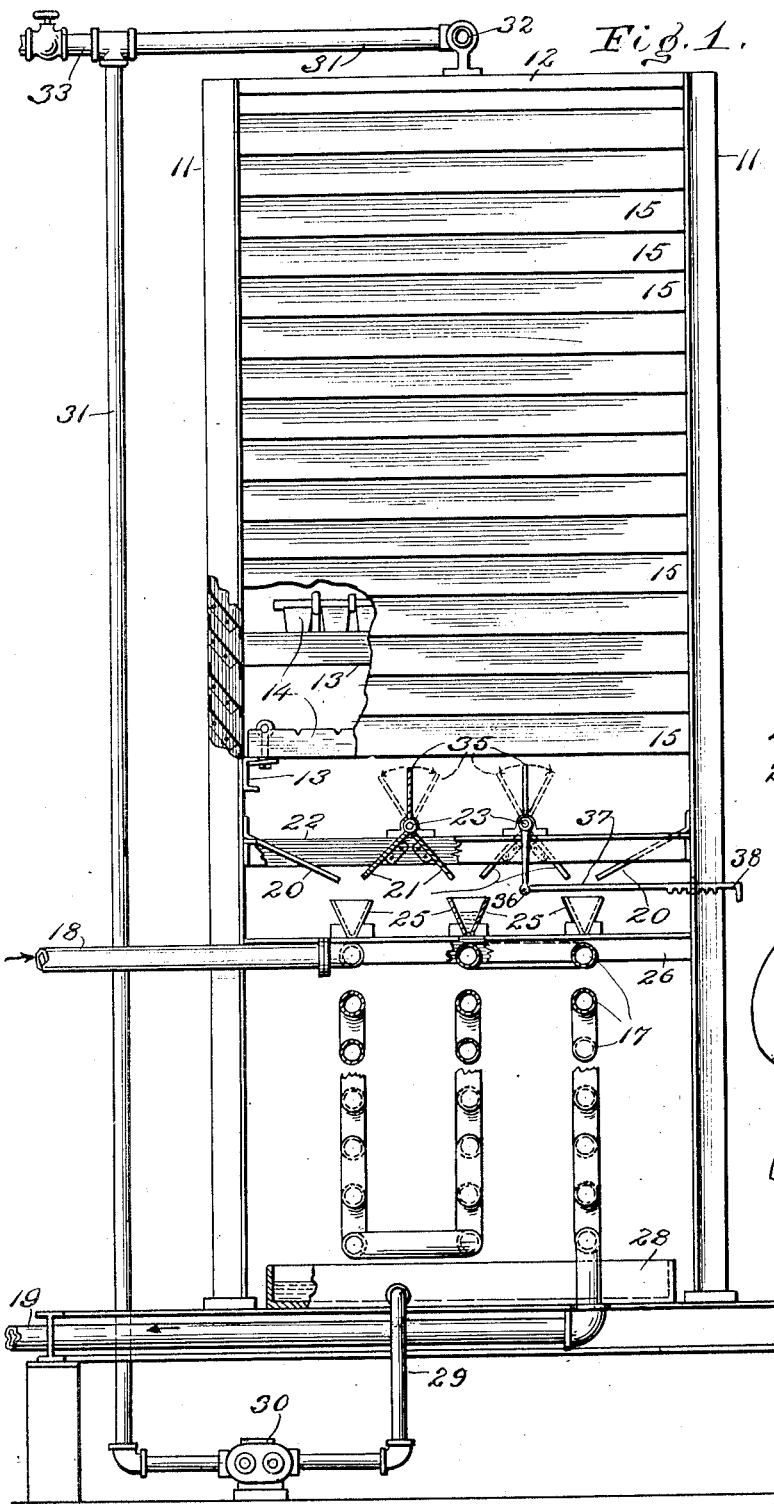
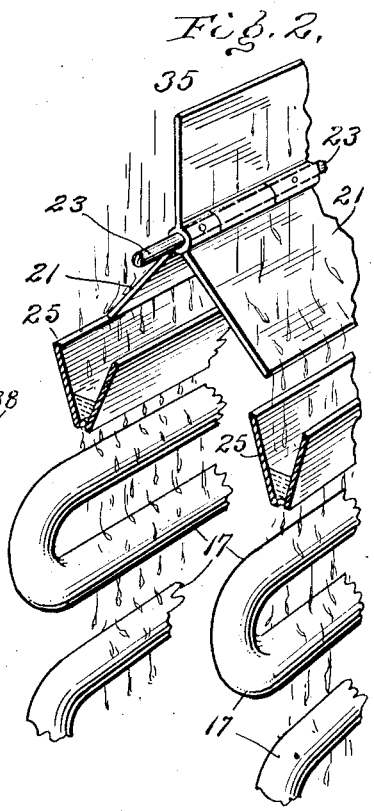
INVENTOR:
Edwin Burhorn
BY Rogers, Kennedy & Campbell,
ATTORNEYS.

Patented Oct. 22, 1929

1,732,963

UNITED STATES PATENT OFFICE

EDWIN BURHORN, OF HOBOKEN, NEW JERSEY

COOLING AND CONDENSING TOWER

Application filed June 20, 1927. Serial No. 200,113.

This invention is a novel cooling and condensing tower, having reference more especially to a combined apparatus for the atmospheric cooling of water and for effecting condensing operations.

A recent instance of a mere cooling tower is that shown in my prior Patent 1,610,255 issued December 14, 1926, this being an apparatus wherein the cooling effects of currents of atmospheric air are utilized to lower the temperature of water, which is distributed and passed through the tower by gravity, by delayed or interrupted descent, so as to be subjected to the requisite contact with atmospheric air, the cooled water being usually drawn off from the collecting pan or vessel at the foot of the tower and passed to its place of use and thence back to the top of the tower for repetition of action. Instead of collecting the descending water and thence passing it to a condensing apparatus, the present invention involves a combination wherein the condensing apparatus or coils are located, and the condensing operation is performed, within the cooling tower itself, prior to the receipt of the water in the collecting vessel. The nearest example in the prior art that I am aware of in which condensing apparatus and a cooling tower are combined is my prior Patent 1,287,630 of December 18, 1918, which is characterized by an arrangement of condensing pipes which extend through the greater part of the height of the tower and in effect are arranged in extended formation in a plurality of tiers interposed between the successive cooling decks of the tower, so as to be exposed at each tier both to the descending water at that point and the natural air currents; and the functions of cooling and condensing may be said to proceed simultaneously through the tower.

The general object of the present invention is to afford a combined cooling and condensing tower which is more efficient and reliable in operation and more simple, inexpensive and durable in construction and operation than prior apparatuses. A particular object is to provide an intercombination of cooling tower and condenser such that the cooling and condensing operations take place substantially successively rather than simultaneously, the water being cooled through the greater extent of the tower and thence applied to the condenser coils and thence received in the collecting vessel for recirculation. A further object is to permit adjustment of the water distribution and descent from the tower to the condenser, which may frequently be useful to vary and adjust the progress of the condensing action, or to offset the tendency of a strong wind to divert laterally the descending water. Other and further objects and advantages of the invention will be pointed out in the hereinafter following description of an illustrative embodiment of the invention or will be apparent to those skilled in the subject matter.

To the attainment of the above referred to objects and advantages the present invention consists in the novel cooling and condensing tower and the novel features of arrangement, combination, operation and construction herein illustrated or described.

In the accompanying drawings Fig. 1 is a side elevation of a cooling and condensing tower embodying the present invention, with certain parts broken away to show more clearly the features involved.

Fig. 2 is a perspective view on an enlarged scale of a certain portion of the apparatus.

The disclosed apparatus constitutes an inexpensive, efficient and compact means of improving the operation and efficiency of condensers for various purposes, for example in connection with refrigerating plants of small capacity.

The general arrangement of the frame work and water passages may be similar to that shown in the prior patents referred to, the details of said 1926 patent having been largely adopted herein for purposes of illustration. The water is conducted to the top of the tower and there sprinkled or distributed and while passing downwardly is caught and delayed at different levels by what are known as cooling decks, each of which operates to hold and sometimes redistribute the water, passing it on downwardly to the next deck and finally to the collecting pan at the base, from where it is drawn for use in the condenser of a steam engine, or the condenser in which the ammonia of a refrigerating apparatus is condensed, or the like; but in these latter respects the present invention is different since the water has performed its condensing function before reaching the collecting pan which is beneath both the tower and the condenser.

The drawings indicate a base structure comprising supporting beams 10 above which stand four corner uprights or columns 11 interconnected at the top by beams 12. At various levels through the upper part of the tower are a series of cross beams 13 supporting water troughs 14, these constituting the cooling decks of the tower, and being arranged preferably in an alternating arrangement from deck to deck, with overflow notches for the discharge from each trough to the troughs of the deck below. The sides of the tower may be enclosed by a system of inclined louvers 15 permitting natural air drafts to flow through the tower while preventing loss of water by splashing.

It will be noticed that the cooling tower is tall enough to accommodate the cooling decks in the upper part of the tower, leaving a substantial space below the series of decks or between them and the base. The condenser, of any form, herein represented by a system of pipes 17, is accommodated in the lower part of the tower. The pipe 18 may be considered the outlet from the refrigerating or other apparatus to the condenser 17, and the pipe 19 the outlet from the condenser or the return pipe to the refrigerating system. The nature and the arrangement of the condenser elements, passages or pipes 17 may be varied, but herein they are shown arranged in sections, each section consisting of a substantially vertical series of interconnected pipes so that water applied to the topmost pipes of each series may drop therefrom to the pipes below and thus downward throughout the pipes in each section, subject all the while to continued cooling effect, through evaporation and air currents, while extracting heat from the condenser coils and the hot fluid flowing therein.

Between the system of cooling decks and the system of condensing pipes is shown a system of parts for properly distributing, conducting or applying the descending water to the several sections of the condenser. Thus near each side of the tower, running parallel to the condenser pipes, is shown a water plate 20, this being inclined inwardly and downwardly so that water received from above will be delivered over the inclined plate to one of the outer sections of condenser pipes. Between the side plates 20 are shown other water plates 21 suitably fixed in place and also inclined for similar purposes of distribution and discharge to the sections of the condenser. The water plates 21 are shown as supported by cross beams 22 through rods or axles 23 mounted on the beams and carrying the plates. Each pair of adjacent water plates is seen to converge downwardly to gather in and deliver the descending water to the respective sections of the condenser.

While this distributing means might deliver directly to the topmost condenser pipes there is preferably employed a system of receiving troughs 25 which may be V-shape in cross section and with bottom openings directly above the topmost condenser pipes. These troughs are therefore in the nature of funnels, receiving the delivered water and feeding it out uniformly to the respective condenser sections. The arrangement and action is well illustrated in Fig. 2 which also shows the manner in which the water plates distribute the descending water to the funnel troughs.

The descending water therefore, after traversing the system of cooling decks, is cooled and properly distributed by the water plates 20 and 21 and thence received and discharged by the water troughs 25 directly to the pipes of the condenser 17. The water running, dropping or trickling down the surface of the condenser pipes is eventually received in a collecting pan 28 arranged inside the tower at the base, this pan therefore serving the purposes of receiving the water both from the cooling decks of the tower and from the condenser system.

The recirculation may be in any desired or well known manner, for example the hot water in the pan may be drawn off by an outlet pipe 29 connecting with a pump 30 which forces the hot water upwardly through pipes 31 to a sprinkler or other form of distrbutor 32 at the top of the tower; a separate water supply connecton 33 being shown as a convenient means of replenishing the water lost by evaporation and otherwise.

It may sometimes be desirable to apply a greater cooling effect to one section of the condenser than to others and for this purpose a water regulating means is shown as will now be described. Also in case a heavy wind is blowing this may give a drift to the descending water and tend to concentrate too much thereof at one condenser section and too little at another, and the regulating means hereof permits correction of this.

For these purposes adjusting plates or what may be called water dampers 35 are shown, these being upstanding plates running the width of the tower parallel to the condenser pipes and arranged to be adjusted to divert more or less water into each of the separate lateral sections or compartments. The two water dampers 35 are shown in full lines in upright position. For convenience they are mounted swingingly on the same axles 23 on which the fixed water plates 21 are supported. The axles 23 may turn loosely with respect to the water plates and may have the dampers 35 attached to them so that by turning the axles the dampers will be adjusted. For example, the adjustment may be in either direction as indicated by the dotted lines in Fig. 1. For the purpose of adjustment each of the axles 23 may have a downwardly extending arm 36 to the lower end of which is pivoted an adjusting rod 37 extending laterally to where it is provided with a notched head and handle 38 fitting into a convenient recess or shoulder on one of the columns of the tower. This mechanical device permits each of the water dampers to be set at various angles so to throw more or less water into each condenser section as described.

It will thus be seen that there has been described a cooling and condensing tower of the atmospheric type embodying the principles and attaining the advantages of the present invention. Since many matters of arrangement, combination, operation and construction may be variously modified without departing from the principles of the invention, it is not intended to limit the same to such matters except to the extent set forth in the appended claims.

What is claimed is:

1. A combined atmospheric condensing and cooling tower comprising the means for distributing the water descending through the tower while exposed to natural air currents, and the collecting vessel therebelow, in combination with a system of condenser pipes in superposed series located between the distributing means and the collecting vessel, and deflecting means between the distributing means and the condenser pipes arranged to direct the descending distributed water to the condenser pipes.

2. A combined atmospheric condensing and cooling tower comprising the means for distributing the water descending through the tower while exposed to natural air currents, and the collecting vessel therebelow, in combination with a system of condenser pipes in vertical series located between the distributing means and the collecting vessel, and also exposed to natural air currents, and deflecting plates between the distributing means and the condenser pipes arranged directly above the latter to direct the descending distributed water to the topmost condenser pipes.

3. The combination as in claim 2 wherein are one or more adjustable regulating plates adapted to throw more or less of the descending water to different portions of the condenser.

4. In a combined atmospheric condensing and cooling tower having means for distributing the water to descend through the tower while exposed to natural air currents, and a collecting vessel therebelow, in combination with a plurality of vertical series of condenser pipes located below the distributing means and the collecting vessel, and deflecting plates between the distributing means and condenser pipes arranged to divide and direct the descending water to the several series of condenser pipes.

5. The combination as in claim 4 wherein the deflecting plates are inclined, and a system of troughs receiving the water from said plates and delivering direct to the topmost of the condenser pipes.

6. A combined atmospheric condensing and cooling tower comprising the means for distributing the water to descend through the tower while exposed to natural air currents, in combination with a system of condenser pipes in superposed series located below the distributing means, a system of troughs immediately above the topmost of each series of condenser pipes, and delivering thereto, and deflecting means above the troughs comprising adjustable plates adapted to vary the amount of water deflected to the respective troughs.

In testimony whereof, I have affixed my signature hereto.

EDWIN BURHORN.